United States Patent [19]

Tieke

[11] Patent Number: 5,122,303
[45] Date of Patent: Jun. 16, 1992

[54] ION-CONDUCTING COMPOSITIONS AND THEIR USE

[75] Inventor: Bernd Tieke, Obernburg, Fed. Rep. of Germany

[73] Assignee: Ciba-Geigy Corporation, Ardsley, N.Y.

[21] Appl. No.: 442,103

[22] Filed: Nov. 28, 1989

[30] Foreign Application Priority Data

Dec. 6, 1988 [CH] Switzerland .................... 4512/88

[51] Int. Cl.$^5$ ................................................ H01B 1/06
[52] U.S. Cl. ..................................... 252/518; 252/519; 252/521
[58] Field of Search ............... 252/512, 518, 519, 520, 252/521, 62.2; 524/401, 435; 429/191–193

[56] References Cited

FOREIGN PATENT DOCUMENTS 2493609 10/1980 France .
60-148003 8/1985 Japan .

OTHER PUBLICATIONS

British Polymer Journal, 1980, 132.
Makromol. Chem. 183, 2693 (1982).
Makromol. Chem. 187, 2317 (1986).

Primary Examiner—Josephine Barr
Attorney, Agent, or Firm—Kevin T. Mansfield

[57] ABSTRACT

Ion-conducting compositions containing (A) a polyester/polyether copolymer prepared from
(1.1) an $\alpha,\omega$-dihydroxy-terminated poly(oxyalkylene),
(1.2) an aromatic dicarboxylic acid or ester-forming derivatives thereof and
(1.3) an aromatic diol or an aromatic hydroxycarboxylic acid or ester-forming derivatives thereof or a mixture of these compounds, or prepared from
(2.1) an $\alpha,\omega$-dicarboxy-terminated poly(oxyalkylene) or ester-forming derivatives thereof,
(2.2) an aromatic diol and
(2.3) an aromatic dicarboxylic acid, an aromatic hydroxycarboxylic acid or ester-forming derivatives thereof or a mixture of these compounds, and (B) a salt of a monovalent to trivalent metal ion of groups Ia to IVa, Ib to VIIb or VIII, are particularly suitable for the production of antistatic films or coatings having an antistatic action or as solid electrolytes for batteries. Some of the polyester/polyether copolymers (A) are novel and the novel copolymers are also claimed.

16 Claims, No Drawings

ION-CONDUCTING COMPOSITIONS AND THEIR USE

The invention relates to ion-conducting compositions containing special polyester/polyether copolymers and a salt of a monovalent to trivalent metal ion of groups Ia to IVa or Ib to VIIb or VIII, to their use, in particular for the production of antistatic films, coatings having an antistatic action or as solid electrolytes for batteries, and to certain novel polyester/polyether copolymers.

Ion-containing compositions containing an oligomeric or polymeric material and an electrolyte salt are known. Various polymers have already been used for complexing the electrolyte salts, for example polyethylene oxide, polymers having polyethylene oxide side chains, polyacid/polyvinyl alcohol polymers or networks having polyethylene oxide chains. The polymers mentioned can accept little mechanical stress and are not suitable for the production of unsupported films.

Certain copolyesters containing polyethers have also already been employed for complexing electrolyte salts.

FR-A 2,493,609 describes compositions containing an electrolyte salt, preferably lithium perchlorate, and an elastomeric copolyester prepared by reacting dimethyl terephthalate with a polyglycol and a diol. Preferred polyglycols are polytetramethylene glycol, polyethylene glycol and polypropylene glycol. Preferred diols are butanediol and ethylene glycol. The compositions are employed as solid electrolytes.

Japanese Preliminary Published Specification 60-148 003/85 describes ion-conducting organic solid electrolytes containig at least one metal salt of group I or II and a high-molecular compound having an average molecular weight of at least 50,000, obtained by reacting a polyalkylene glycol having an average molecular weight of at least 5,000 and containing at least 70% by weight of ethylene oxide units with a polycarboxylic acid or the anhydride or lower alkyl esters thereof.

The present invention relates to ion-conducting compositions containing (A) a polyester/polyether copolymer prepared from
(1.1) an α,ω-dihydroxy-terminated poly(oxyalkylene),
(1.2) an aromatic dicarboxylic acid or ester-forming derivatives thereof and
(1.3) an aromatic diol or an aromatic hydroxycarboxylic acid or ester-forming derivatives thereof or a mixture of these compounds, or prepared from
(2.1) an α,ω-dicarboxy-terminated poly(oxyalkylene) or ester-forming derivatives thereof,
(2.2) an aromatic diol and
(2.3) an aromatic dicarboxylic acid, an aromatic hydroxycarboxylic acid or ester-forming derivatives thereof or a mixture of these compounds, and
(B) a salt of a monovalent to trivalent metal ion of groups Ia to IVa, Ib to VIIb or VIII.

The designations of the groups Ia to IVa, Ib to VIIb or VIII for the metal salts (B) relate to the periodic system as in the Merck Index, 9th Edition, 1976.

The ion-conducting compositions according to the invention, i.e. the polymer-electrolyte salt complexes, are readily soluble in conventional solvents and can be processed without problems to give unsupported films or coatings. The films are transparent within the visible region of the spectrum and have an ionic conductivity of up to $10^{-6}$ S cm$^{-1}$ at 20° C. and their thermal and mechanical properties can be varied widely by altering their composition. The ion-conducting compositions according to the invention display better mechanical properties than the previously known organic solid electrolytes. In the present polyester/polyether copolymers, surprisingly, no phase separation or demixing of the aromatic polyester components and the poly(oxyalkylene) blocks takes place. The copolymers are homogeneous and amorphous and exhibit only one single glass transition.

Because of their excellent properties, the compositions are particularly suitable for the production of antistatic films or coatings having an antistatic action or as solid electrolytes for batteries. The present invention also relates, therefore, to the use of the compositions according to the invention for the fields of application mentioned.

Preferred compositions are those in which the ratios of the components (1.1) to (1.3) are so chosen that 5–95, preferably 10–90 and particularly preferably 25–75, % of the OH groups originate from the component (1.1) and the remaining OH groups originate from the component (1.3), and also those in which the ratios of the components (2.1) to (2.3) are so chosen that 5–95, preferably 10–90 and particularly preferably 25–75, % of the COOH groups originate from the component (2.1) and the remaining COOH groups originate from the component (2.3).

The poly(oxyalkylene)s (1.1) or (2.1) preferably contain 2–8, in particular 2–4, C atoms per alkylene group and are derived, in particular, from a polyethylene glycol, a polypropylene glycol or a polytetrahydrofuran. They can be either homopolymers or copolymers, it being possible for the latter to be built up statistically or sequentially (as block polymers). Homopolymers are preferred.

Particularly preferred components (1.1) are compounds of the formula I and particularly preferred components (2.1) are compounds of the formula II

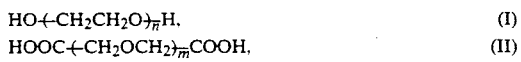

in which m and n are an integer from 2 to 200, preferably 3 to 20 and particularly preferably 3 to 15. Compounds of the formula II can also be illustrated as

If aromatic diols are employed as the component (1.3) or (2.2) of the compositions according to the invention, they are preferably compounds of the formula III

in which $R_A$ is a divalent, mononuclear or dinuclear aromatic radical having 6 to 10 C atoms which is unsubstituted or substituted by halogen atoms, $C_1$–$C_4$alkyl groups, phenyl, $C_1$–$C_4$alkylphenyl or halogenophenyl, or is a group of the formula IV

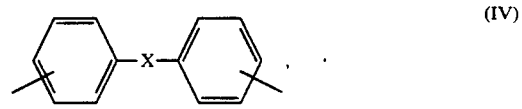

in which X is a direct bond, methylene, isopropylidene, O, CO, S, SO$_2$, CH=CR$^1$, C≡C, N=N,

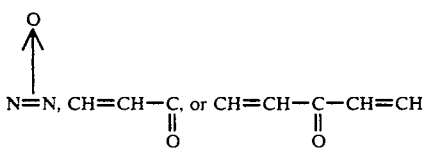

and R¹ is hydrogen, halogen or $C_1$-$C_4$alkyl.

Examples of suitable $C_1$-$C_4$alkyl groups are methyl, ethyl, n-propyl, isopropyl and n-, iso-, sec- and tert-butyl. Examples of suitable halogen atoms are fluorine, chlorine, bromine or iodine.

The aromatic radical $R_A$ can contain one or more of the substituents mentioned per ring; preferably, it is not substituted. If the radical $R_A$ is a group of the formula IV, it is preferably a 4,4'-substituted radical.

The aromatic dicarboxylic acids, aromatic hydroxycarboxylic acids or α,ω-dicarboxy-terminated poly(oxyalkylene)s used for the preparation of the copolymer (A) in the compositions according to the invention can be employed as the free acids or as ester-forming derivatives of the acids. Examples of suitable ester-forming derivatives are anhydrides, acid halides, such as chlorides or bromides, or lower alkyl esters, for example $C_1$-$C_4$alkyl esters, of the corresponding acids. The corresponding compounds and the esterification thereof are known to those skilled in the art.

The aromatic hydroxycarboxylic acids employed as the component (1.3) or (2.3) are preferably compounds of the formula V

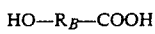   (V), in which $R_B$ is a divalent, mononuclear or dinuclear aromatic radical having 6 to 10 C atoms which can contain halogen or $C_1$-$C_4$alkyl substituents, or is a radical of the formula VI

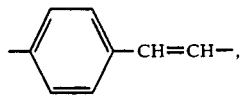   (VI)

in which the hydroxyl group of the hydroxycarboxylic acid is attached to the phenyl ring (cinnamic acid). What has been said in the case of the radical $R_A$ applies to the halogen and $C_1$-$C_4$alkyl substituents on the radical $R_B$.

Aromatic dicarboxylic acids employed as the component (1.2) or (2.3) are preferably compounds of the formula VII

   (VII), in which $R_C$ is as defined for the radical $R_A$ in compounds of the formula (III).

Examples of suitable aromatic diols are 1,2-, 1,3- and 1,4-dihydroxybenzene, dihydroxynaphthalenes, for example 2,7-dihydroxynaphthalene, 4,4'-dihydroxybiphenyl, bis-(4-hydroxyphenyl)-methane and 2,2-bis-(4-hydroxyphenyl)-propane. Examples of suitable aromatic hydroxycarboxylic acids are 4-hydroxybenzoic acid and cinnamic acid. Examples of suitable aromatic dicarboxylic acids are isophthalic acid, terephthalic acid, phthalic acid, naphthalenedicarboxylic acids, for example 2,7-naphthalenedicarboxylic acid, and 4,4'-biphenyldicarboxylic acid.

The aromatic diols of the formula III most preferred for the preparation of the polyester/polyether copolymers (A) are compounds in which the radical $R_A$ is 1,4-phenylene or 1,3-phenylene or the group of the formula VIII

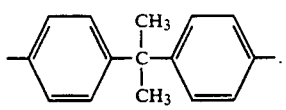   (VIII)

The most preferred aromatic hydroxycarboxylic acid of the formula V is the compound in which $R_B$ is 1,4-phenylene, i.e. 4-hydroxybenzoic acid.

The most preferred aromatic dicarboxylic acids are terephthalic acid and isophthalic acid or mixtures of both, i.e. compounds of the formula VII in which $R_C$ is 1,4-phenylene or 1,3-phenylene.

The components (1.1) to (1.3) and (2.1) to (2.3) can be employed in the form of pure compounds or as mixtures of such compounds.

The compounds used as components (1.1) to (1.3) and (2.1) to (2.3) are known and are commercially available. The conversion of such compounds into polyesters and suitable procedures for obtaining polymers having specified molecular weight distributions are also known to those skilled in the art.

Several of the polyester/polyether copolymers (A) of the compositions according to the invention or related polymers are known and their liquid-crystal behaviour has been investigated [cf., for example, British Polymer Journal, 1980, 132; Makromol. Chem. 187, 2317 (1986) and Makromol. Chem. 183, 2693 (1982)]. The use of such copolymers in ion-conducting compositions is not yet known.

Copolymers having a viscosity number (determined in tetrahydrofuran at 30° C.) of more than 0.2, in particular more than 0.3 and most of all more than 0.4, are preferably employed as component (A) in the compositions according to the invention. Copolymers having a degree of polymerization greater than 6, in particular greater than 20 and very particularly preferably greater than 30, are also preferred.

In the synthesis of the polyester/polyether copolymers, it is preferable to employ the diols, dicarboxylic acids and hydroxycarboxylic acids or ester-forming derivatives used in stoichiometric amounts.

The present invention also relates to novel polyester/polyether copolymers prepared from (i) an α,ω-dicarboxy-terminated poly(oxyalkylene) of the formula II

   (II)

in which m is an integer from 2 to 200, or ester-forming derivatives thereof, (ii) an aromatic diol and (iii) an aromatic dicarboxylic acid, an aromatic hydroxycarboxylic acid or ester-forming derivatives thereof or a mixture of these compounds.

What has already been said in connection with the polyesters (A) of the present ion-containing composition applies in respect of the preferred components (i), (ii) and (iii) for the preparation of the novel polyester/polyether copolymers according to the invention.

The electrolyte salt (B) of the compositions according to the invention is a salt of a monovalent to trivalent metal ion of groups Ia to IVa, Ib to VIIb or VIII. For reasons of application, preferred salts are those which are readily soluble in polar aprotic solvents (for example from about 0.5 mg/ml to about 0.5 g/ml) and which dissociate as completely as possible. Salts of cations having a small radius are also preferred, since these can be complexed more readily by polymers, and also salts having so-called soft counter-ions.

Examples of suitable salts are alkali metal salts, such as Li, Na, K, Rb or Cs salts, divalent salts, such as Mg, Ca, Ba, Cu(II), Zn or Pb(II) salts, or trivalent salts, for example iron(III) salts, with various counter-ions, for example $ClO_4^-$, $BF_4^-$, $CF_3SO_3^-$, $PF_6^-$, $Cl^-$, $Br^-$, $I^-$, $SCN^-$, $NO_3^-$ or 7,7,8,8-tetracyanoquinodimethane$^-$ (TCNQ$^-$).

Preferred salts (B) are salts of metal ions of the group Ia, IIa, VIII or Ib. Copper, iron, sodium or especially lithium salts are particularly preferred. Examples of suitable salts are $FeCl_3$, $CuCl_2$, NaSCN, NaI, $LiO_3SCF_3$, LiTCNQ and especially $LiClO_4$.

The ratios of the components (A) and (B) in the compositions according to the invention are preferably so chosen that 0.01 to 0.5, preferably 0.02 to 0.2 and particularly preferably 0.03 to 0.1, mole of the salt (B) is present per molar equivalent of ether-oxygen atom in the polyether/polyester copolymer (A).

Mixtures of different copolymers and/or mixtures of different metal salts can also be employed as components (A) and (B).

In general, compositions whose conductivity is at least $10^{-10}$ S cm$^{-1}$ are preferred.

If it is advantageous, it is also possible to add to the compositions according to the invention one or more compounds having a high dielectric constant, in order to increase the dissociation of the electrolyte salt and thus to increase the ionic conductivity, provided that other important properties are not thereby impaired. Examples of suitable compounds having a high dielectric constant are dimethylformamide, dimethylacetamide, ethylene carbonate, propylene carbonate, gamma-butyrolactone or crown ether compounds.

The ion-conducting compositions according to the invention can, for example, be applied to a suitable substrate in a common solvent for the components (A) and (B). After the solvent has been removed by evaporation, a layer of the ion-conducting composition is obtained on the substrate, and this can, if advantageous, be stripped off from the substrate in the form of a film and can, if desired, be compressed to give a moulding or a test specimen. Examples of suitable common solvents are tetrahydrofuran, methylene chloride, tetrachloroethane, methanol, acetone, dimethylformamide or solvent mixtures.

The following Examples illustrate the invention.

EXAMPLES

The molecular weights indicated in the Examples were determined by gel permeation chromatography. The column used was calibrated with polystyrene.

The chemicals used were pretreated or purified in the following way:

Acid chloride

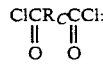
ClCR$_C$CCl:

Terephthalic and isophthalic acid dichlorides (Fluka, purum) were post-chlorinated and recrystallized analogously to a method described by H. W. Hässlin et al., Makromol. Chem. 181 (1980) 301–323.

Bisphenols HOR$_4$OH: Bisphenol A (Fluka, purum) was recrystallized in a water/ethanol mixture (volume ratio 5:7). Hydroquinone was sublimed at 140° C. and 20 mbar. Resorcinol (Fluka, purissimum) was dried in vacuo at 90° C.

Diols HO(CH$_2$CH$_2$O)$_n$H: Technical polyethylene glycols (Hoechst 600DAB8 and Hoechst 400DAB8) and tetraethylene glycol (Fluka, purissimum) were used. The technical diols were dried azeotropically by adding 10 ml of benzene to 100 g of diol in each case and then distilling off the benzene/water mixture under normal pressure and later under reduced pressure. Distillation was completed at 120° C. and 0.1 mmHg. The molecular weights of the diols were $\overline{M}_n = 530$, $\overline{M}_w = 560$ (Hoechst 400 DAB8) and $\overline{M}_n = 790$, $\overline{M}_w = 830$ (Hoechst 600 DAB8), respectively.

Diacid chlorides

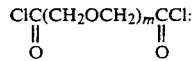
ClC(CH$_2$OCH$_2$)$_m$CCl:

The starting materials used were technical polyglycol diacids made by Hoechst ($\overline{M}_n = 510$, $\overline{M}_w = 690$, acid content 3.25 mol/kg). The acid chlorides were prepared from the diacids by heating 0.2 mol of diacid to 50° C. and then adding 150 ml of SOCl$_2$ dropwise. The mixture was then boiled under reflux for one hour and excess SOCl$_2$ was distilled off. Finally, 10 ml of toluene were also added and distilled off again in order to remove residual SOCl$_2$. The residue was a slightly cloudy, yellowish liquid which was used without further treatment.

Pyridine (Fluka, purissimum) and 1,1,2,2-tetrachloroethane (Fluka, purissimum) were distilled and dried over molecular sieves.

Methylene chloride (Fluka, purissimum) was distilled over P$_2$O$_5$.

Tetrahydrofuran (Fluka, purissimum) was distilled and dried over sodium.

Dimethylformamide (Fluka, purissimum) was subjected to vacuum distillation before use.

Lithium perchlorate (Fluka, purissimum) was dried overnight in vacuo at 100° C. before use; all the other electrolyte salts (Fluka, purissimum or Aldrich) were used without further treatment. Lithium tetracyanoquinodimethane (LiTCNQ) was prepared as directed in J. Am. Chem. Soc. 84 (1962) 3374.

EXAMPLES 1–35

Synthesis[1]) of copolyesters consisting of the units
—OR$_4$O—, —O(CH$_2$CH$_2$O)$_n$— and

—CR$_C$C— in a statistical sequence.

[1]) The synthesis is carried out analogously to operating instructions by J.-I. Jin et al., British Polymer Journal 1980, 132.

x[2]) mole of HOR$_4$OH, y[2]) mole of HO(CH$_2$CH$_2$O)$_n$H and 25 ml of pyridine in 100 ml of 1,1,2,2-tetrachloroethane are initially placed in a three-necked flask equipped with a stirrer, a dropping funnel and a gas inlet tube. A solution of (x+y)[2]) mole of

in 100 ml of 1,1,2,2-tetrachloroethane is added dropwise to the above solution in the course of one hour. The mixture is then stirred for 20 hours and then worked up. All the procedures are carried out with rigid exclusion of moisture ($N_2$ flushing).

[2] For precise details on the number of moles employed see Table 1

If the resulting polymer is precipitated during the reaction, the mixture is warmed to 100° C. and stirred for a further 3 hours and then cooled and worked up.

Working up is carried out by precipitating the polymer in approx. 15 to 20 times its volume of methanol or acetone (see Table). The mixture is then stirred for a further two hours. The polymer is then filtered off, washed with methanol and dried in a drying cabinet at 80° C. and 6.65 kPa.

If the polymer is liquid, the supernatant solvent phase of polymer is decantered off after the polymer solution has been added dropwise to methanol. Methanol is then added, the mixture stirred for 30 minutes and the solvent phase decantered off. The polymer is dried in a drying cabinet at 80° C. and 6.65 kPa. Characteristic data of the polymers are listed in Table 1.

TABLE 1

Characteristic data of the polyether/polyester copolymers consisting of the units $-OR_AO-$, $-O(CH_2CH_2O)_n-$ and $-\overset{O}{\overset{\|}{C}}-R_C-\overset{O}{\overset{\|}{C}}-$ in a statistical sequence.
Composition of the polymer in mol

| Exp. No. | $-OR_AO-$ | $-\overset{O}{\overset{\|}{C}}-R_C-\overset{O}{\overset{\|}{C}}-$ | $-O(CH_2CH_2O)_n-$ | C, H analysis [%] | | Yield in theory [% of [g]] | Precipitated in | $[\eta]^{1)}$ | $\overline{M_n}^{2)}$ | $\overline{M_w}^{2)}$ | $T_g$ [°C] | $TGA^{3)}$ [°C] |
|---|---|---|---|---|---|---|---|---|---|---|---|---|
| | $R_A=$ (bisphenol A structure) | $R_C=$ (p-phenylene) | n = 4 | | | | | | | | | |
| 1 | 0.09 | 0.1 | 0.01 | calc. C 75.45 H 5.17 | found C 74.39 H 5.19 | 35.7 100 | Methanol | insoluble | — | — | — | 340 |
| 2 | 0.07 | 0.1 | 0.03 | calc. C 72.10 H 5.38 | found C 71.05 H 5.41 | 33.4 95.9 | Methanol | 0.543 | 7600 | 29000 | 91 | 375 |
| 3 | 0.05 | 0.1 | 0.05 | calc. C 68.61 H 5.61 | found C 68.88 H 5.63 | 33.7 79.0 | Acetone | 0.558 | 16000 | 85000 | 30 | 370 |
| 4 | 0.03 | 0.1 | 0.07 | calc. C 64.98 H 5.85 | found C 65.31 H 5.90 | 25.5 76.2 | Methanol | 0.335 | 22000 | 39000 | 14 | 380 |
| | | $R_C=$ (p-phenylene) + (m-phenylene) | n = 4 | | | | | | | | | |
| 5 | 0.07 | 0.07 + 0.03 | 0.03 | calc. C 72.10 H 5.38 | found C 72.26 H 5.37 | 29.1 83.5 | Acetone | 0.445 | 25000 | 49000 | 95 | 385 |
| 6 | 0.09 | 0.05 + 0.05 | 0.01 | calc. C 75.45 H 5.17 | found C 73.92 H 5.17 | 31.6 88.9 | Acetone | 0.417 | 21000 | 37000 | 144 | 395 |
| 7 | 0.07 | 0.05 + 0.05 | 0.03 | calc. C 72.10 H 5.38 | found C 72.28 H 5.33 | 19.3 55.4 | Acetone | 0.320 | 15000 | 25000 | 80 | 400 |
| 8 | 0.05 | 0.05 + 0.05 | 0.05 | calc. C 68.61 H 5.61 | found C 68.47 H 5.43 | 44.2 86.3 | Methanol | 0.494 | 26000 | 50000 | 45 | 375 |
| 9 | 0.07 | 0.03 + 0.07 | 0.03 | calc. C 72.10 H 5.38 | found C 72.56 H 5.29 | 28.1 80.6 | Acetone | 0.474 | 29000 | 64000 | 104 | 390 |
| | | $R_C=$ (p-phenylene) | n ~ 9 | | | | | | | | | |
| 10 | 0.07 | 0.1 | 0.03 | calc. C 69.39 H 5.97 | found C 69.40 H 5.95 | 36.7 89.2 | Acetone | 0.662 | 5600 | 49000 | 20 | 340 |
| 11 | 0.05 | 0.1 | 0.05 | calc. C 65.28 H 6.45 | found C 65.23 H 6.38 | 32.4 72.4 | Acetone | 0.737 | 60000 | 111000 | −15 | 350 |
| 12 | 0.03 | 0.1 | 0.07 | calc. C 61.78 H 6.86 | found C 61.26 H 6.85 | 39.3 81.4 | Methanol | 0.601 | 30000 | 85000 | −20 | 370 |
| 13 | 0.01 | 0.1 | 0.09 | calc. C 58.75 H 7.21 | 35.0 67.0 | | Methanol | 0.586 | 34000 | 81000 | −25 | 355 |

TABLE 1-continued

Characteristic data of the polyether/polyester copolymers consisting of the units —OR$_A$O—, —O(CH$_2$CH$_2$O)$_n$— and —C(=O)—R$_C$—C(=O)— in a statistical sequence.
Composition of the polymer in mol

| Exp. No. | —OR$_A$O— R$_A$ = | —C(=O)—R$_C$—C(=O)— R$_C$ = | —O(CH$_2$CH$_2$O)$_n$— | | C, H analysis [%] | | Yield [g] | Yield in theory [% of] | Precipitated in | [η]$^{1)}$ | $\overline{M_n}^{2)}$ | $\overline{M_w}^{2)}$ | Tg [°C] | TGA$^{3)}$ [°C] |
|---|---|---|---|---|---|---|---|---|---|---|---|---|---|---|
| | (bisphenol C(CH$_3$)$_2$) | (p-phenylene) + (m-phenylene) | | | found | | | | | | | | | |
| | | | n∼9 | | C 58.66 | H 7.19 | | | | | | | | |
| 14 | 0.07 | 0.03 + 0.07 | | calc. | C 69.39 | H 5.97 | 33.7 | 91.6 | Acetone/Methanol 1:1 | 0.577 | 33000 | 81000 | — | 365 |
| | | | | found | C 68.49 | H 5.92 | | | | | | | | |
| 15 | 0.09 | 0.05 + 0.05 | 0.01 | calc. | C 74.28 | H 5.39 | 33.2 | 88.3 | Acetone | 0.435 | 23000 | 51000 | 112 | 390 |
| | | | | found | C 74.01 | H 5.47 | | | | | | | | |
| 16 | 0.07 | 0.05 + 0.05 | 0.03 | calc. | C 69.39 | H 5.97 | 23.3 | 56.7 | Acetone | 0.425 | 24000 | 48000 | 45 | 365 |
| | | | | found | C 69.69 | H 5.89 | | | | | | | | |
| 17 | 0.05 | 0.05 + 0.05 | 0.05 | calc. | C 65.28 | H 6.45 | 33.0 | 76.5 | Acetone/Methanol 1:1 | 0.440 | 20000 | 52000 | 5 | 365 |
| | | | | found | C 65.17 | H 6.44 | | | | | | | | |
| 18 | 0.03 | 0.05 + 0.05 | 0.07 | calc. | C 61.78 | H 6.86 | 24.2 | 50.1 | Methanol | 0.354 | 20000 | 39000 | −25 | 360 |
| | | | | found | C 61.95 | H 6.89 | | | | | | | | |
| | | | n∼13 | | | | | | | | | | | |
| 19 | 0.07 | 0.1 | 0.03 | calc. | C 67.63 | H 6.34 | 41.4 | 88.6 | Acetone | 0.776 | 29000 | 128000 | −15 | 290 |
| | | | | found | C 67.50 | H 6.34 | | | | | | | | |
| 20 | 0.05 | 0.1 | 0.05 | calc. | C 63.44 | H 6.91 | 39.5 | 73.1 | Methanol | 0.857 | 34000 | 124000 | −30 | 365 |
| | | | | found | C 63.25 | H 6.88 | | | | | | | | |
| 21 | 0.03 | 0.1 | 0.07 | calc. | C 60.24 | H 7.34 | 4.15 | 67.8 | Methanol | 0.957 | 83000 | 234000 | −40 | 370 |
| | | | | found | C 59.97 | H 7.36 | | | | | | | | |
| | | | n∼13 | | | | | | | | | | | |
| 22 | 0.09 | 0.05 + 0.05 | 0.01 | calc. | C 73.35 | H 5.57 | 36.3 | 92.0 | Acetone | 0.898 | 35000 | 102000 | 105 | 360 |
| | | | | found | C 72.86 | H 5.54 | | | | | | | | |
| 23 | 0.07 | 0.05 + 0.05 | 0.03 | calc. | C 67.63 | H 6.34 | 38.6 | 82.7 | Acetone | 0.926 | 40000 | 116000 | 20 | 350 |
| | | | | found | C 67.60 | H 6.35 | | | | | | | | |
| 24 | 0.05 | 0.05 + 0.05 | 0.05 | calc. | C 63.44 | H 6.91 | 51.0 | 95.0 | Methanol | 0.937 | 32000 | 113000 | −15 | 340 |
| | | | | found | C 62.65 | H 6.77 | | | | | | | | |

TABLE 1-continued

Characteristic data of the polyether/polyester copolymers consisting of the units $-OR_AO-$, $-O(CH_2CH_2O)_n-$ and $-\overset{\overset{O}{\|}}{C}-R_C-\overset{\overset{O}{\|}}{C}-$ in a statistical sequence.

| Exp. No. | Composition of the polymer in mol | | | | C, H analysis [%] | | Yield [g] | Yield in theory [% of] | Precipitated in | [η]¹⁾ | Physical data | | | $T_g$ [°C] | TGA³⁾ [°C] |
|---|---|---|---|---|---|---|---|---|---|---|---|---|---|---|---|
| | $-OR_AO-$ | $-\overset{O}{\overset{\|}{C}}-R_C-\overset{O}{\overset{\|}{C}}-$ | $-O(CH_2CH_2O)_n-$ | | | | | | | | $\overline{M_n}^{2)}$ | $\overline{M_w}^{2)}$ | | | |
| 25 | 0.03 | 0.05 | 0.07 | calc. found | C 60.24 H 7.34 C 60.41 H 7.40 | | 22.9 | 74.9 | Methanol | 0.789 | 27000 | 79000 | | −27 | 340 |
| 26 | 0.07 | 0.03 | 0.03 | calc. found | C 67.63 H 6.34 C 66.78 H 6.26 | | 24.2 | 51.7 | Acetone | 0.852 | 74000 | 137000 | | 17 | 350 |
| | $R_A =$ ⌬ (para) | | n ~13 | | | | | | | | | | | | |
| 27 | 0.07 | 0.1 $R_C =$ ⌬ (para) | 0.03 | calc. found | C 62.49 H 5.87 C 61.72 H 5.90 | | 36.3 | 94.3 | Methanol | — | insoluble in THF | | | −15 | 370 |
| 28 | 0.05 | 0.1 | 0.05 | calc. found | C 59.99 H 6.71 C 59.18 H 6.81 | | 45.1 | 93.8 | Methanol | — | insoluble in THF | | | −15 | 365 |
| 29 | 0.03 | 0.1 | 0.07 | calc. found | C 58.32 H 7.27 C 57.21 H 7.25 | | 47.9 | 83.1 | Methanol | 0.79 | 22000 | 128000 | | −35 | 365 |
| 30 | 0.015 | 0.1 | 0.085 | calc. found | C 57.40 H 7.58 C 56.70 H 7.55 | | 48.3 | 74.4 | Methanol | 1.019 | 44000 | 98000 | | −35 | 360 |
| | $R_A =$ ⌬ (para) | $R_C =$ ⌬ (para) + ⌬ (meta) | n ~13 | | | | | | | | | | | | |
| 31 | 0.03 | 0.07 | 0.01 | calc. found | C 58.32 H 7.27 C 57.21 H 7.04 | | 47.8 | 82.9 | Methanol | 0.912 | 64000 | 130000 | | −38 | 360 |
| 32 | 0.05 | 0.05 | 0.05 | calc. found | C 59.99 H 6.71 C 59.99 H 6.69 | | 43.5 | 90.4 | Methanol | 0.718 | | insoluble in THF | | −25 | 370 |
| 33 | 0.03 | 0.05 | 0.07 | calc. found | C 58.32 H 7.27 C 58.12 H 7.22 | | 45.5 | 78.9 | Methanol | 0.799 | 34000 | 108000 | | <−10 | 365 |
| | $R_A =$ ⌬ (para) + ⌬ (meta) | $R_C =$ ⌬ (para) + ⌬ (meta) | n ~13 | | | | | | | | | | | | |
| 34 | 0.025 + 0.025 | 0.05 | 0.05 | calc. found | C 59.99 H 6.71 C 59.48 H 6.72 | | 43.1 | 89.7 | Methanol | 0.636 | 20000 | 76000 | | −30 | 375 |
| | $R_A =$ ⌬ (meta) | $R_C =$ ⌬ (para) + ⌬ (meta) | | | | | | | | | | | | | |
| 35 | 0.05 | 0.05 | 0.05 | calc. found | C 59.99 H 6.71 C 59.52 H 6.64 | | 39.1 | 81.4 | Methanol | 0.589 | 27000 | 70000 | | −25 | 365 |

¹⁾measured in 1:4 tetrahydrofuran (THF)/1,1,2,2-tetrachloroethane, at 30° C.
²⁾determined by gel permeation chromatography (stationary phase: Ultrastyragel of pore diameter $10^6$, $10^5$, $10^4$ $10^3$ Å; mobile phase: THF, T = 22 ± 1° C, flow rate 0.96 ml/minute)
³⁾thermogravimetric analysis the temperature indicated is that at which the loss in weight is 5%.

EXAMPLES 36–40

Synthesis of copolyesters consisting of the units
—OR$_A$O—,

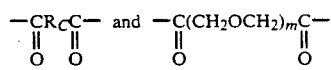 and 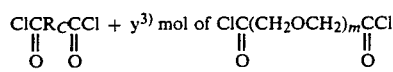

in a statistical sequence

The procedure is as described under Examples 1–5. As a modification, $(x+y)^{3)}$ mol of HOR$_A$OH and 25 ml of pyridine are initially taken in 100 ml of 1,1,2,2-tetrachloroethane (TCE) and $x^{3)}$ mol of ClCR$_C$CCl + $y^{3)}$ mol of ClC(CH$_2$OCH$_2$)$_m$CCl
‖   ‖                    ‖              ‖
O   O                    O              O in 100 ml of TCE are added dropwise. Characteristic data of the polymers are listed in Table 2.

$^{3)}$for precise details on the numbers of moles employed see Table 2

EXAMPLES 41–43

Synthesis of polyether/polyester copolymers consisting of the units

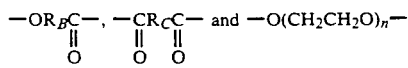

and in a sequential succession

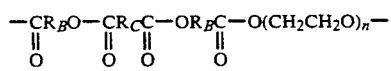

The procedure is as described under Examples 1–35. As a modification, 0.1 mol of HO(CH$_2$CH$_2$O)$_n$H and 25 ml of pyridine are initially taken in 100 ml of TCE, and 0.1 mol of the diacid dichloride

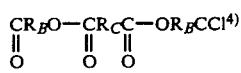

in 100 ml of TCE are added dropwise.

Characteristic data of the polymers are listed in Table 3.

$^{4)}$The diacid dichloride employed is a 1:1 mixture of the substances in which

TABLE 2

Characteristic data of the polyether/polyester copolymers consisting of the units —OR$_A$O—, —O(CH$_2$CH$_2$O)$_n$— and —C—R$_C$—C— in a statistical sequence.
‖        ‖
O        O

| Exp. No. | —OR$_A$O— | —C—R$_C$—C— ‖ ‖ O O | —O(CH$_2$CH$_2$O)$_n$— | C, H analysis [%] | [g] | Yield in [% of theory] | Precipitated in |
|---|---|---|---|---|---|---|---|
| | R$_A$ = —⟨C$_6$H$_4$⟩—C(CH$_3$)$_2$—⟨C$_6$H$_4$⟩—, | R$_C$ = —⟨C$_6$H$_4$⟩— | m~3 | | | | |
| 36 | 0.1 | 0.07 | 0.03 | calc. C 73.63 H 5.48 found C 72.74 H 5.49 | 35.5 | 93.0 | Acetone |
| 37 | 0.1 | 0.05 | 0.05 | calc. C 71.49 H 5.74 found C 70.76 H 5.73 | 29.6 | 74.4 | Acetone |
| | R$_A$ = —⟨C$_6$H$_4$⟩—C(CH$_3$)$_2$—⟨C$_6$H$_4$⟩—, | R$_C$ = —⟨C$_6$H$_4$⟩— | m~12 | | | | |
| 38 | 0.1 | 0.07 | 0.03 | calc. C 69.03 H 6.36 found C 68.90 H 6.35 | 45.4 | 91.9 | Acetone/Methanol 1:1 |
| 39 | 0.1 | 0.05 | 0.05 | calc. C 65.74 H 6.90 found C 66.00 H 6.70 | 18.9 | 32.7 | Acetone/Methanol 1:1 |
| 40 | 0.1 | 0.03 | 0.07 | calc. C 63.33 H 7.29 found C 62.82 H 7.20 | 20.3 | 60.9 | Acetone/Methanol 1:1 |

| Example No. | physical data [η]$^{1)}$ | $M_n^{2)}$ | $M_w^{2)}$ | Tg [°C] |
|---|---|---|---|---|
| 36 | 0.510 | insoluble in THF | 50 | |
| 37 | 0.538 | 6600 | 59000 | 54 |
| 38 | 0.651 | 13000 | 41000 | −14 |
| 39 | 0.562 | 13000 | 41000 | −19 |
| 40 | 0.511 | 22000 | 27000 | −23 |

$^{1)}$measured in 1:4 tetrahydrofuran (THF)/1,1,2,2-tetrachloroethane, at 30° C.
$^{2)}$determined by gel permeation chromatography (stationary phase: Ultrastyragel of pore diameter 10$^6$, 10$^5$, 10$^4$ and 10$^3$ Å; mobile phase: THF, T = 22 ± 1° C. flow rate 0.96 ml/minute)

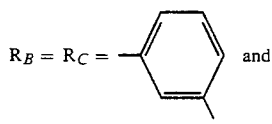 and

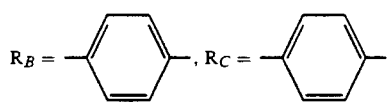

These acid chlorides are prepared by the method described by G. Galli et al. in Makromol. Chem. 183 (1982) 2693.

EXAMPLES A1–A52

Forming complexes of the polymers with LiClO₄ and measuring their electrical conductivity Complexes of the polymers with $LiClO_4$ were formed by three different processes:

A) 2 g of the polymer are dissolved in 15 ml of anhydrous THF, and solid $LiClO_4$ in a molar ratio of $Li^+$ to —$CH_2CH_2O$— units of 1:50 to 1:5 is added. Immediately after the salt has been added a clear solution is formed and this is stirred for approx. 5 minutes. The solution is then poured onto a sheet of glass (76 × 26 × 1 mm) and distributed by means of a 100μ doctor blade. The coated sheets of glass are first dried by being stored for 30 minutes at room temperature in an atmosphere of $N_2$ dried over $P_2O_5$. They are then stored overnight in

TABLE 3

Characteristic data of the polyether/polyester copolymers
$$-CR_BO-CR_CC-OR_BC-O(CH_2CH_2O)_n- \atop \| \quad \| \quad \| \quad \| \atop O \quad O \quad O \quad O$$

| Exp. No. | $R_B$ | $R_C$ | n | C, H analysis [%] | Yield [g] | Yield [% of theory] | Precipitated in |
|---|---|---|---|---|---|---|---|
| 41 | (phenylene) | (phenylene) + (tolyl) (1:1) | 4 | calc. C 63.83 H 5.00 found C 63.40 H 5.03 | 6.6 | 58.6 | Acetone/Water 3:1 |
| 42 | (phenylene) | (phenylene) + (tolyl) (1:1) | ~9 | calc. C 61.29 H 6.13 found C 58.91 H 6.07 | 9.8 | 63.3 | Methanol |
| 43 | (phenylene) | (phenylene) + (tolyl) (1:1) | ~13 | calc. C 59.99 H 6.17 found C 59.46 H 6.86 | 10.9 | 59.2 | Methanol |

| Example No. | physical data | | | | |
|---|---|---|---|---|---|
| | $[\eta]^{1)}$ | $\overline{M_n}^{2)}$ | $\overline{M_w}^{2)}$ | Tg [°C.] | TGA³⁾ [°C.] |
| 41 | 0.25 | 10000 | 16000 | 35 | 370 |
| 42 | 0.21 | 6700 | 11000 | −17 | 365 |
| 43 | 0.26 | 6900 | 16000 | −27 | 375 |

1) measured in 1:4 tetrahydrofuran (THF)/1,1,2,2-tetrachloroethane, at 30° C.
2) determined by gel permeation chromatography (stationary phase: Ultrastyragel of pore diameter $10^6$, $10^5$, $10^4$ and $10^3$ Å; mobile phase: THF, T = 22 ± 1° C. flow rate 0.96 ml/minute)
3) thermogravitic analysis the temperature indicated is that at which the loss in weight is 5% a desiccator at 50° C. and 0.1 mbar. The film formed is then scratched off and compressed to give a pellet. The specific conductivity of this pellet is measured at 20° C. and 100° C.

B) 2.4 g of the polymer are dissolved in approx. 20 ml of $CH_2Cl_2$, and 3 ml of THF are added. Solid $LiClO_4$ is then added in $Li/-CH_2CH_2O-$ ratios of 1:30 to 1:5. Further treatment is carried out as described under (A).

C) 4 g of the polymer are dissolved in 10 ml of TCE, and 3 ml of THF are added. Solid $LiClO_4$ is then added in $Li/-CH_2CH_2O-$ ratios of 1:30 to 1:5. Further treatment is carried out as described under (A). As a modification, the films are dried at 70° C. and 50 mbar.

The compositions and conductivities of some polymer-$LiClO_4$ complexes are listed in Table 4.

EXAMPLES A53–A56

Forming complexes of the polymers with $CuCl_2$ and measuring their specific conductivity $\sigma$ 1.4 g of the polymer from Example 23 are dissolved in 5 ml of TCE, and 2 ml of methanol are added. After stirring for approx. 30 minutes a clear solution is obtained. Anhydrous $CuCl_2$ is added to this solution in molar ratios of $Cu^{2+}$ to $-CH_2CH_2O-$ units of 1:60 to 1:6. After a short time the $CuCl_2$ is dissolved. The solution is now poured onto sheets of glass ($76 \times 26 \times 1$ mm) and distributed by means of a 100$\mu$ doctor blade. The coated sheets of glass are first dried in a desiccator for approx. 30 minutes at 80° C. and 50 mbar and are then dried overnight at 80° C. and 0.1 mbar. The film formed is then scratched off and compressed to give a pellet. The specific conductivity of this pellet is measured at

TABLE 4

Compositions and conductivities $\sigma$ of some polymer-$LiClO_4$ complexes

| Example No. | Polymer from Example | Complexing process | Molar ratio $Li^+/-CH_2CH_2O-$ | $\sigma$ (20° C.) [S cm$^{-1}$] | $\sigma$ (100° C.) [S cm$^{-1}$] |
|---|---|---|---|---|---|
| A1 | 3 | A | 0.20 | $1.3 \times 10^{-7}$ | — |
| A2 | 10 | B | 0.20 | $1.8 \times 10^{-7}$ | $4.6 \times 10^{-6}$ |
| A3 | 10 | B | 0.10 | $2.7 \times 10^{-9}$ | — |
| A4 | 11 | B | 0.20 | $3.6 \times 10^{-7}$ | $1.6 \times 10^{-6}$ |
| A5 | 11 | B | 0.07 | $3.4 \times 10^{-8}$ | $1.0 \times 10^{-6}$ |
| A6 | 11 | B | 0.05 | $1.2 \times 10^{-8}$ | $2.4 \times 10^{-7}$ |
| A7 | 11 | B | 0.04 | $2.0 \times 10^{-8}$ | $2.8 \times 10^{-7}$ |
| A8 | 11 | B | 0.033 | $2.2 \times 10^{-8}$ | $2.2 \times 10^{-7}$ |
| A9 | 17 | A | 0.20 | $2.0 \times 10^{-7}$ | $4.3 \times 10^{-6}$ |
| A10 | 17 | A | 0.10 | $5.7 \times 10^{-9}$ | $2.8 \times 10^{-8}$ |
| A11 | 17 | A | 0.07 | $5.5 \times 10^{-9}$ | $1.2 \times 10^{-7}$ |
| A12 | 17 | A | 0.05 | $5.5 \times 10^{-9}$ | $1.5 \times 10^{-7}$ |
| A13 | 17 | A | 0.035 | $5.6 \times 10^{-9}$ | $4.4 \times 10^{-8}$ |
| A14 | 19 | B | 0.20 | $1.1 \times 10^{-7}$ | $1.2 \times 10^{-5}$ |
| A15 | 19 | B | 0.10 | $2.3 \times 10^{-8}$ | $4.8 \times 10^{-7}$ |
| A16 | 19 | B | 0.07 | $1.2 \times 10^{-8}$ | $1.2 \times 10^{-7}$ |
| A17 | 19 | B | 0.04 | $3.7 \times 10^{-9}$ | $8.6 \times 10^{-9}$ |
| A18 | 19 | B | 0.035 | $7.3 \times 10^{-9}$ | $7.8 \times 10^{-9}$ |
| A19 | 23 | A | 0.20 | $7.5 \times 10^{-8}$ | $2.4 \times 10^{-6}$ |
| A20 | 23 | A | 0.10 | $2.1 \times 10^{-8}$ | $1.2 \times 10^{-6}$ |
| A21 | 23 | A | 0.07 | $4.5 \times 10^{-9}$ | $2.0 \times 10^{-7}$ |
| A22 | 23 | A | 0.05 | $1.1 \times 10^{-9}$ | $2.0 \times 10^{-7}$ |
| A23 | 23 | A | 0.04 | $1.4 \times 10^{-9}$ | $2.5 \times 10^{-8}$ |
| A24 | 24 | A | 0.05 | $1.1 \times 10^{-7}$ | $2.5 \times 10^{-7}$ |
| A25 | 24 | A | 0.04 | $1.1 \times 10^{-7}$ | $5.8 \times 10^{-7}$ |
| A26 | 24 | A | 0.035 | $1.2 \times 10^{-7}$ | $5.1 \times 10^{-7}$ |
| A27 | 26 | A | 0.20 | $1.3 \times 10^{-7}$ | $3.3 \times 10^{-6}$ |
| A28 | 26 | A | 0.10 | $1.4 \times 10^{-8}$ | $1.0 \times 10^{-6}$ |
| A29 | 26 | A | 0.07 | $2.9 \times 10^{-9}$ | $3.8 \times 10^{-8}$ |
| A30 | 26 | A | 0.05 | $1.5 \times 10^{-9}$ | $1.4 \times 10^{-8}$ |
| A31 | 31 | A* | 0.10 | $3.0 \times 10^{-7}$ | $4.8 \times 10^{-6}$ |
| A32 | 31 | A* | 0.07 | $3.8 \times 10^{-7}$ | $5.2 \times 10^{-6}$ |
| A33 | 31 | A* | 0.05 | $3.8 \times 10^{-7}$ | $5.5 \times 10^{-6}$ |
| A34 | 31 | A* | 0.04 | $6.6 \times 10^{-7}$ | $2.8 \times 10^{-6}$ |
| A35 | 31 | A* | 0.033 | $5.1 \times 10^{-7}$ | $7.0 \times 10^{-6}$ |
| A36 | 31 | A* | 0.02 | $3.6 \times 10^{-7}$ | $3.4 \times 10^{-6}$ |
| A37 | 33 | A | 0.10 | $2.0 \times 10^{-7}$ | $5.0 \times 10^{-6}$ |
| A38 | 33 | A | 0.07 | $1.3 \times 10^{-7}$ | $2.3 \times 10^{-6}$ |
| A39 | 33 | A | 0.05 | $9.8 \times 10^{-8}$ | $1.8 \times 10^{-6}$ |
| A40 | 33 | A | 0.04 | $1.4 \times 10^{-7}$ | $2.3 \times 10^{-6}$ |
| A41 | 33 | A | 0.033 | $1.6 \times 10^{-7}$ | $2.9 \times 10^{-6}$ |
| A42 | 33 | A | 0.02 | $5.4 \times 10^{-8}$ | $6.6 \times 10^{-6}$ |
| A43 | 38 | C | 0.20 | $9.3 \times 10^{-8}$ | $1.1 \times 10^{-5}$ |
| A44 | 38 | C | 0.10 | $8.0 \times 10^{-9}$ | $4.1 \times 10^{-7}$ |
| A45 | 38 | C | 0.07 | $4.0 \times 10^{-9}$ | $4.3 \times 10^{-8}$ |
| A46 | 39 | B | 0.20 | $3.0 \times 10^{-7}$ | $3.2 \times 10^{-6}$ |
| A47 | 39 | B | 0.10 | $3.9 \times 10^{-8}$ | $2.7 \times 10^{-6}$ |
| A48 | 39 | B | 0.07 | $5.7 \times 10^{-8}$ | $7.1 \times 10^{-7}$ |
| A49 | 39 | B | 0.05 | $3.0 \times 10^{-8}$ | $8.6 \times 10^{-6}$ |
| A50 | 39 | B | 0.04 | $2.4 \times 10^{-8}$ | $1.9 \times 10^{-6}$ |
| A51 | 39 | B | 0.035 | $2.3 \times 10^{-8}$ | $2.4 \times 10^{-5}$ |
| A52 | 41 | B | 0.20 | $1.3 \times 10^{-7}$ | $1.3 \times 10^{-6}$ |

*Solvent: 4:1 tetrahydrofuran/methylene chloride.

20° C. and 100° C. The composition and conductivity of the polymer-$CuCl_2$ complexes are listed in Table 5.

TABLE 5

| Example No. | Compositions and conductivities σ of some polymer-$CuCl_2$ complexes | | |
|---|---|---|---|
| | Molar ratio $Cu^{2+}$/—$CH_2CH_2O$— | δ (20° C.) [S cm$^{-1}$] | δ (100° C.) [S cm$^{-1}$] |
| A53 | 0.09 | $3.8 \times 10^{-9}$ | $1.4 \times 10^{-5}$ |
| A54 | 0.05 | $2.9 \times 10^{-9}$ | $6.8 \times 10^{-6}$ |
| A55 | 0.03 | $1.5 \times 10^{-9}$ | $4.8 \times 10^{-6}$ |
| A56 | 0.02 | $2.5 \times 10^{-9}$ | $8.9 \times 10^{-7}$ |

EXAMPLES A57–A58

Forming complexes of the polymers with $FeCl_3$ and measuring their specific conductivity σ

1.4 g of the polymer from Example 23 are dissolved in 5 ml of TCE, and 2 ml of methanol are added. Anhydrous $FeCl_3$ is added to this solution in a molar ratio of $Fe^{3+}$ to —$CH_2CH_2O$— units of 1:50 to 1:5. Further treatment is carried out as described in Examples A53-A56. The composition and conductivity of the polymer-$FeCl_3$ complexes are listed in Table 6.

TABLE 6

| Example No. | Compositions and conductivities σ of some polymer-$FeCl_3$ complexes | |
|---|---|---|
| | Molar ratio $Fe^{3+}$/—$CH_2CH_2O$— | δ (100° C.) [S cm$^{-1}$] |
| A57 | 0.20 | $6.2 \times 10^{-5}$ |
| A58 | 0.02 | $2.2 \times 10^{-6}$ |

EXAMPLES A59–A61

Forming complexes of the polymers with NaSCN and measuring the specific conductivity σ

2.4 g of the polymer from Example 23 are dissolved in 10 ml of TCE, and 4 ml of acetone are added. NaSCN is added to this solution in a molar ratio of $Na^+$ to —$CH_2CH_2O$— units of 1:50 to 1:5. Further treatment is carried out as for Examples A53–A56. The composition and conductivity of the polymer-NaSCN complexes are listed in Table 7.

TABLE 7

| Example No. | Compositions and conductivities σ of some polymer-NaSCN complexes | | |
|---|---|---|---|
| | Molar ratio $Na^+$/—$CH_2CH_2O$— | δ (20° C.) [S cm$^{-1}$] | δ (100° C.) [S cm$^{-1}$] |
| A59 | 0.20 | $3.2 \times 10^{-9}$ | $9.8 \times 10^{-7}$ |
| A60 | 0.09 | $1.4 \times 10^{-8}$ | $8.3 \times 10^{-7}$ |
| A61 | 0.05 | $1.2 \times 10^{-9}$ | $5.9 \times 10^{-7}$ |

EXAMPLES A62–A64

Forming complexes of the polymers with NaI and measuring the specific conductivity σ

1.8 g of the polymer from Example 26 are dissolved in 15 ml of THF, and 6 ml of acetone are added. NaI is added to this solution in a molar ratio of $Na^+$ to —$CH_2CH_2O$— units of 1:50 to 1:5. Further treatment is carried out as for Examples A1–A52. The composition and conductivity of the polymer-NaI complexes are listed in Table 8.

TABLE 8

| Example No. | Compositions and conductivities σ of some polymer-NaI complexes | | |
|---|---|---|---|
| | Molar ratio $Na^+$/—$CH_2CH_2O$— | δ (20° C.) [S cm$^{-1}$] | δ (100° C.) [S cm$^{-1}$] |
| A62 | 0.20 | $6.4 \times 10^{-7}$ | $1.8 \times 10^{-5}$ |
| A63 | 0.10 | $1.0 \times 10^{-8}$ | $8.6 \times 10^{-7}$ |
| A64 | 0.07 | $1.3 \times 10^{-9}$ | $5.8 \times 10^{-7}$ |

EXAMPLES A65–A68

Forming complexes of the polymers with LiTCNQ and measuring their specific conductivity σ

1.2 g of the polymer from Example 23 are dissolved in 10 ml of dimethylformamide. LiTCNQ is added to this solution in a molar ratio of $Li^+$ to —$CH_2CH_2O$— units of 1:30 to 1:5. Further treatment is carried out as for Examples A1–A52. Drying is effected by keeping the coated sheets of glass at room temperature for 1.5 hours under $N_2$ and then storing them in a desiccator overnight at 50° C. and 0.1 mbar. The composition and conductivity of the polymer-LiTCNQ complexes are listed in Table 9.

TABLE 9

| Example No. | Compositions and conductivities σ of some polymer-$Li^+$/TCNQ-complexes | |
|---|---|---|
| | Molar ratio $Li^+$/—$CH_2CH_2O$— | δ (100° C.) [S cm$^{-1}$] |
| A65 | 0.20 | $1.7 \times 10^{-6}$ |
| A66 | 0.10 | $2.3 \times 10^{-7}$ |
| A67 | 0.05 | $2.8 \times 10^{-7}$ |
| A68 | 0.03 | $3.2 \times 10^{-7}$ |

EXAMPLES A69–A73

Forming complexes of the polymers with $LiCF_3SO_3$ and measuring their specific conductivity σ

1.2 g of the polymer from Example 23 are dissolved in 10 ml of THF. Solid $LiCF_3SO_3$ is added to this solution in a molar ratio of $Li^+$ to —$CH_2CH_2O$— units of 1:50 to 1:10. Further treatment is carried out as for Examples A53–A56. The composition and conductivity of the polymer-$LiCF_3SO_3$ complexes are listed in Table 10.

TABLE 10

| Example No. | Compositions and conductivities σ of some polymer-$LiCF_3SO_3$ complexes | | |
|---|---|---|---|
| | Molar ratio $Li^+$/—$CH_2CH_2O$— | δ (20° C.) [S cm$^{-1}$] | δ (100° C.) [S cm$^{-1}$] |
| A69 | 0.10 | $2.2 \times 10^{-7}$ | $4.0 \times 10^{-6}$ |
| A70 | 0.07 | $2.2 \times 10^{-7}$ | $1.5 \times 10^{-6}$ |
| A71 | 0.05 | $8.2 \times 10^{-8}$ | $7.9 \times 10^{-7}$ |
| A72 | 0.04 | $1.9 \times 10^{-8}$ | $6.2 \times 10^{-7}$ |
| A73 | 0.02 | $6.7 \times 10^{-9}$ | $2.4 \times 10^{-7}$ |

EXAMPLE B1

Testing the mechanical properties by the elongation test

Polymer solutions are first prepared in a solvent mixture composed of 7 parts by volume of 1,1,2,2-tetrachloroethane and 3 parts by volume of tetrahydrofuran (concentration: 0.3 g of polymer/ml), and, if appropriate, $LiClO_4$ is added in molar ratios of $Li^+$/—$CH_2C$-$H_2O$— of 1:10 to 1:50. These solutions are poured onto sheets of glass (200×200 mm), using a 220 μ doctor blade to give films. After drying (30 minutes at 50° C. and then 48 hours at 80° C. in vacuo), the sheets of glass are cooled to approx. 5° C., and the films are stripped off in the form of unsupported films. Test specimens (length 25 mm, width 6 mm and thickness 30 μm) are prepared from the films, and their mechanical properties are tested by the elongation test (Zwick apparatus, model 1445) at 20° C. The results are listed in Table 11.

TABLE 11

| Polymer from Example | Li+/—CH2C-H2O— | Elasticity modulus [N/mm²] | Breaking strength [N/mm²] | Elongation at break [%] |
|---|---|---|---|---|
| 2 | — | 2100 | 30 | 1.3 |
| 3 | — | 1900 | 38 | 3.5 |
| 6 | — | 2200 | 51 | 2.8 |
| 8 | — | 2400 | 41 | 1.7 |
| 10 | — | 540 | 28 | 116 |
| 11 | — | 63 | 7.7 | 278 |
| 15 | — | 2100 | 31 | 1.4 |
| 19 | — | 138 | 23 | 225 |
| 22 | — | 1600 | 38 | 14 |
| 23 | 0.02 | 67 | 37 | 305 |
| 23 | 0.03 | 158 | 42 | 280 |
| 23 | 0.05 | 192 | 27 | 228 |
| 23 | 0.07 | 195 | 43 | 238 |
| 23 | 0.10 | 306 | 23 | 161 |

What is claimed is:

1. An ion-conducting composition comprising
(A) a polyester/polyether copolymer prepared from
   (1.1) a α,ω-dihydroxy-terminated polyethylene glycol, polypropylene glycol or polytetrahydrofuran,
   (1.2) an aromatic dicarboxylic acid or ester-forming derivative thereof having formula VII

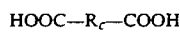
   HOOC—R$_C$—COOH  (VII)

wherein R$_C$ is a divalent, mononuclear or dinuclear aromatic radical having 6 to 10 C atoms which is unsubstituted or substituted by halogen atoms, C$_1$-C$_4$alkyl groups, —(CH$_2$OCH$_2$)$_m$— wherein m is 2 to 200, phenyl, C$_1$-C$_4$alkylphenyl or halogenophenyl, or is a group of the formula IV

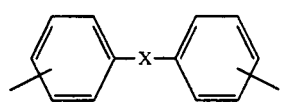
   (IV)

in which X is a direct bond, methylene, isopropylidene, O, CO, S, SO$_2$, CH=CR$^1$, C≡C, N=N,

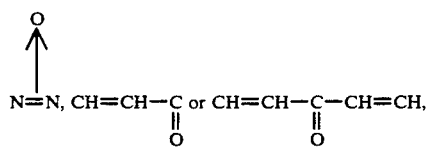

and R$^1$ is hydrogen, halogen or C$_1$-C$_4$alkyl and
   (1.3) an aromatic diol of formula III

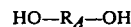
   HO—R$_A$—OH  (III), in which R$_A$ is as defined for R$_C$ or (1.3) is an aromatic hydroxycarboxylic acid or ester-forming derivative thereof having formula V

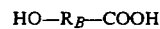
   HO—R$_B$—COOH  (V)

in which R$_B$ is a divalent, mononuclear or dinuclear aromatic radical having 6 to 10 C atoms which can contain halogen or C$_1$-C$_4$alkyl [substituents], or is a radical of the formula VI

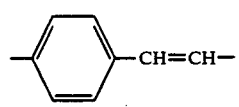
   (VI)

in which the hydroxyl group of the hydroxycarboxylic acid is attached to the phenyl ring, or the copolymer is prepared from a mixture of these compounds wherein the ratios of components (1.1) to (1.3) are so chosen that 5-95% of the OH groups originate from the component (1.1) and the remaining OH groups originate from the component (1.3) or said copolymer is prepared from
   (2.1) an α,ω—dicarboxy—terminated polyethylene glycol, polypropylene glycol or polytetrahydrofuran, or ester forming derivative thereof,
   (2.2) an aromatic diol of the formula III

   HO—R$_A$—OH  (III)

in which R$_A$ is as defined for R$_C$,
   (2.3) an aromatic dicarboxylic acid or ester-forming derivative thereof having formula VII or an aromatic hydroxycarboxylic acid or ester-forming derivative thereof having formula V or a mixture of these compounds wherein the ratios of components (2.1) to (2.3) are so chosen that 5-95% of the COOH groups originate from the component (2.1) and the remaining COOH groups originate from the component (2.3), and
(B) a salt of a monovalent to trivalent metal ion of groups Ia to IVa, Ib to VIIb or VIII, wherein the ratio of components (A) and (B) is so chosen that 0.01 to 0.5 mole of the salt (B) is present per molar equivalent of ether-oxygen atom in the polyether/polyester copolymer (A).

2. A composition according to claim 1, wherein the component (1.1) is a compound of the formula I and the component (1.2) is a compound of the formula II

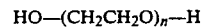
HO—(CH$_2$CH$_2$O)$_n$—H  (I),

HOOC—(CH$_2$OCH$_2$)$_m$—COOH  (II), in which m and n are an integer from 2 to 200.

3. A composition according to claim 1, wherein the radical R$_A$ is 1,4-phenylene, 1,3-phenylene or the group of the formula VIII

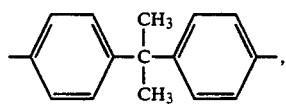
(VIII)

R$_B$ is 1,4-phenylene and R$_C$ is 1,4-phenylene or 1,3-phenylene.

4. A composition according to claim 1, wherein the salt (B) is a salt of a metal ion of the group Ia, IIa, Ib or VIII.

5. A composition according to claim 4, wherein the salt is selected from the group consisting of a copper, iron, sodium and lithium salt.

6. A composition according to claim 5, wherein the salt is lithium perchlorate.

7. A composition according to claim 1, in which the ion conductivity is at least $10^{-10} Scm^{-1}$.

8. A composition according to claim 1, wherein the ratios of the components (1.1) to (1.3) are so chosen that 10-90% of the OH groups originate from the component (1.1) and the remaining OH groups originate from the component (1.3).

9. A composition according to claim 1, wherein the ratios of the components (1.1) to (1.3) are so chosen that 25-75% of the OH groups originate from the component (1.1) and the remaining OH groups originate from the component (1.3).

10. A composition according to claim 1, wherein the ratios of the components (2.1) to (2.3) are so chosen that 10-90% of the COOH groups originate from the component (2.1) and the remaining COOH groups originate from the component (2.3).

11. A composition according to claim 1, wherein the ratios of the components (2.1) to (2.3) are so chosen that 25-75% of the COOH groups originate from the component (2.1) and the remaining COOH groups originate from the component (2.3).

12. A composition according to claim 2, wherein m and n are an integer from 3 to 20.

13. A composition according to claim 12, wherein m and n are an integer from 3 to 15.

14. A composistion according to claim 5 wherein the salt is a lithium salt.

15. A composition according to claim 1, wherein the ratio of components (A) and (B) is so chosen that 0.02 to 0.2 mole of the salt (B) is present per molar equivalent of ether-oxygen atom in the polyether/polyester copolymer(A).

16. A composition according to claim 1, wherein the ratio of components (A) and (B) is so chosen that 0.03 to 0.1 mole of the salt (B) is present per molar equivalent of ether-oxygen atom in the polyether/polyester copolymer(A).

* * * * *